(12) United States Patent
Yamada et al.

(10) Patent No.: US 9,688,239 B2
(45) Date of Patent: Jun. 27, 2017

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Kazuhiro Yamada, Aichi-ken (JP); Akira Sumiyashiki, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 153 days.

(21) Appl. No.: 14/154,584

(22) Filed: Jan. 14, 2014

(65) Prior Publication Data

US 2014/0197262 A1    Jul. 17, 2014

(30) Foreign Application Priority Data

Jan. 15, 2013 (JP) ................................. 2013-004731

(51) Int. Cl.
*B60R 22/38* (2006.01)
*B60R 22/405* (2006.01)
(52) U.S. Cl.
CPC ................... *B60R 22/405* (2013.01)
(58) Field of Classification Search
CPC .............................. B60R 22/38; B60R 22/405
USPC ....... 242/383.2, 383; 297/476, 478; 280/806
See application file for complete search history.

(56) References Cited

U.S. PATENT DOCUMENTS

| 4,471,918 A * | 9/1984 | Ando ................... B60R 22/4671 242/372 |
| 4,635,874 A * | 1/1987 | Swindlehurst .......... B60R 22/41 242/383.1 |
| 4,687,156 A * | 8/1987 | Mori ........................... 242/383.1 |
| 4,767,078 A * | 8/1988 | Fohl ............................ 242/383.2 |
| 5,820,060 A * | 10/1998 | Yano ..................... B60R 22/405 242/384.4 |
| 7,384,014 B2 * | 6/2008 | Ver Hoven et al. ........ 242/382.2 |
| 2007/0284870 A1 * | 12/2007 | Saito et al. .................... 280/806 |
| 2007/0290091 A1 * | 12/2007 | Mori ..................... B60R 22/405 242/383.1 |
| 2008/0191083 A1 * | 8/2008 | Sumiyashiki ............... 242/382.2 |
| 2009/0057466 A1 * | 3/2009 | Choi et al. .................... 242/377 |
| 2011/0089282 A1 * | 4/2011 | Guillem ..................... 242/383.1 |

FOREIGN PATENT DOCUMENTS

JP    2003-212085 A    7/2003

* cited by examiner

*Primary Examiner* — Sang Kim
(74) *Attorney, Agent, or Firm* — Roberts Mlotkowsksi Safran Cole & Calderon P.C.

(57) ABSTRACT

The present invention provides a webbing take-up device that can effectively suppress tilt of a rotation body when an actuation member has been actuated. In a webbing take-up device, tilt restricting portions are provided at a V gear. The tilt restricting portions are provided at a radial direction inner side than a place of engagement between a W pawl and ratchet teeth of a sensor holder and project further toward a sensor holder side than an end surface at the sensor holder side, which end surface is at the outer side in the radial direction than the place of engagement. For this reason, tilt of the V gear with respect to its axial direction can be restricted.

9 Claims, 7 Drawing Sheets

WEBBING TAKE-UP DEVICE

CROSS-REFERENCE TO RELATED APPLICATION

This application claims priority under 35 USC 119 Japanese Patent Application No. 2013-004731, filed Jan. 15, 2013, the disclosure of which is incorporated by reference herein.

BACKGROUND

Field of the Invention

The present invention relates to a webbing take-up device that takes up webbing for occupant restraint onto a spool (take-up drum).

Related Art

Japanese Patent Application Laid-Open (JP-A) No. 2003-212085 discloses a seat belt retractor provided with an emergency lock mechanism. In this seat belt retractor, a pawl provided on a lock base and a lock arm provided on a lock clutch body are actuated in response to a sudden pulling-out of webbing, whereby the emergency lock mechanism is activated and the rotation of a take-up drum in a pull-out direction of the webbing is regulated.

In the above-described seat belt retractor, the lock arm is supported, in such a way as to be actuatable in an actuation range, in an eccentric position on the lock clutch body. The lock mechanism is activated as a result of the lock arm engaging with inner teeth formed on a tubular engagement inner peripheral wall of a cover body in response to a sudden pulling-out of the webbing. A holder that swingably supports a sensor weight and a sensor lever that is rotatably supported are disposed on the cover body.

Incidentally, when the lock arm has been actuated so that the lock mechanism has been activated, there has been the potential for a rotational moment being generated in an axial direction of the lock clutch body about the place of engagement between the lock arm and the inner teeth of the cover body, so that tilt occurs in the lock clutch body.

SUMMARY

In consideration of the above-described circumstances, the present invention obtains a webbing take-up device that can effectively suppress tilt of a rotation body when an actuation member is actuated.

A webbing take-up device pertaining to a first aspect of the invention includes: a spool that is rotated in a pull-out direction by a webbing being pulled out; a rotation body that is rotated in accompaniment with the rotation of the spool; an actuation member that is provided at the rotation body and that is actuated when the rotation body is rotated in the pull-out direction with an acceleration equal to or greater than a predetermined value; a regulating member that, when actuated, regulates rotation of the spool in the pull-out direction; a sensor holder that is disposed to face the rotation body, and that engages with the actuation member when the actuation member is actuated whereby the regulating member is actuated; and a tilt restricting portion that is disposed on the rotation body, that projects further toward a sensor holder side than an end surface at the sensor holder side of the rotation body, which end surface is disposed at an outer side in a radial direction of the rotation body than a place at which the actuation member and the sensor holder are engaged, and that restricts tilt of the rotation body with respect to an axial direction of the rotation body by being brought into contact with the sensor holder.

In a webbing take-up device pertaining to a second aspect of the invention, in the first aspect, the rotation body has a columnar shaped stopper portion that limits an actuation range of the actuation member and that protrudes toward the sensor holder side, and the tilt restricting portion is provided at an end portion at the sensor holder side of the stopper portion.

In a webbing take-up device pertaining to a third aspect of the invention, in the first aspect or the second aspect, the rotation body has a columnar shaped actuation shaft that actuatably supports the actuation member and that protrudes toward the sensor holder side, and the tilt restricting portion is provided at an end portion at the sensor holder side of the actuation shaft.

In a webbing take-up device pertaining to a fourth aspect of the invention, in any one of the first aspect to the third aspect, a plurality of tilt restricting portions are respectively disposed in three or more places on the rotation body, which places are separated from one another in a circumferential direction of rotation of the rotation body.

In a webbing take-up device pertaining to a fifth aspect of the invention, in any one of the first aspect to the fourth aspect, the tilt restricting portion is formed in a hemispherical shape whose top portion is located at the sensor holder side.

In the webbing take-up device of the first aspect, the spool is rotated in the pull-out direction as a result of the webbing being pulled out. The rotation body is rotated in accompaniment with the rotation of the spool, and the actuation member is provided at the rotation body. Furthermore, the sensor holder is disposed to face the rotation body. When the rotation body has been rotated in the pull-out direction by an acceleration equal to or greater than the predetermined value, the actuation member is actuated and engages with the sensor holder, whereby the regulating member is actuated and the rotation of the spool in the pull-out direction is regulated.

Here, the tilt restricting portion is disposed at the rotation body. The tilt restricting portion projects further toward a sensor holder side than an end surface at the sensor holder side of the rotation body, which end surface is disposed at an outer side in a radial direction of the rotation body than a place at which the actuation member and the sensor holder are engaged. For this reason, tilt of the rotation body that occurs when the actuation member has been actuated and has engaged with the sensor holder is restricted as a result of the tilt restricting portion being brought into contact with the sensor holder. Consequently, according to the webbing take-up device of the first aspect, tilt of the rotation body when the actuation member has been actuated can be effectively suppressed.

In the webbing take-up device of the second aspect, the columnar shaped stopper portion that limits the actuation range of the actuation member and that projects toward the sensor holder side is provided on the rotation body. Additionally, the tilt restricting portion is provided on the end portion at the sensor holder side of the stopper portion. Here, the stopper portion is provided in the neighborhood of the actuation member, so even in a case where tilt has occurred in the actuation member when the actuation member has engaged with the sensor holder, the actuation member can be suppressed from being brought, by the tilt, into contact with the sensor holder due to the tilt restricting portion being brought into contact with the sensor holder in the neighborhood of the actuation member.

In the webbing take-up device of the third aspect, the columnar shaped actuation shaft that actuatably supports the actuation member and that projects toward the sensor holder side is provided on the rotation body. Additionally, the tilt restricting portion is provided on the end portion at the sensor holder side of the actuation shaft. Here, the actuation member is supported on the actuation shaft and is provided in the neighborhood of the actuation shaft, so even in a case where tilt has occurred in the actuation member when the actuation member has engaged with the sensor holder, the actuation member can be suppressed from being brought, by the tilt, into contact with the sensor holder due to the tilt restricting portion being brought into contact with the sensor holder in the neighborhood of the actuation member.

In the webbing take-up device of the fourth aspect, the tilt restricting portions are respectively disposed in three or more places on the rotating body, which places are spaced apart from one another in the circumferential direction of rotation of the rotation body. When tilt has occurred in the rotation body, the tilt of the rotation body is suppressed by the tilt restricting portions in the first place and the second place that have made contact with the sensor holder. Additionally, when tilt has further occurred in the rotation body, the tilt restricting portion in the third or more places makes contact with the sensor holder, so eventually the tilt of the rotation body can be reduced.

In the webbing take-up device of the fifth aspect, the tilt restricting portion(s) is(are) formed in a hemispherical shape whose top portion is located at the sensor holder side. For this reason, the contact between the tilt restricting portion and the sensor holder is point contact, so friction between the tilt restricting portion and the sensor holder can be made small so that the affect that the tilt restricting portion has on the rotation of the rotation body when the tilt restricting portion has been brought into contact with the sensor holder can be reduced.

BRIEF DESCRIPTION OF THE DRAWINGS

An embodiment of the invention will be described in detail with reference to the following figures, wherein.

DETAILED DESCRIPTION

Figure 1:
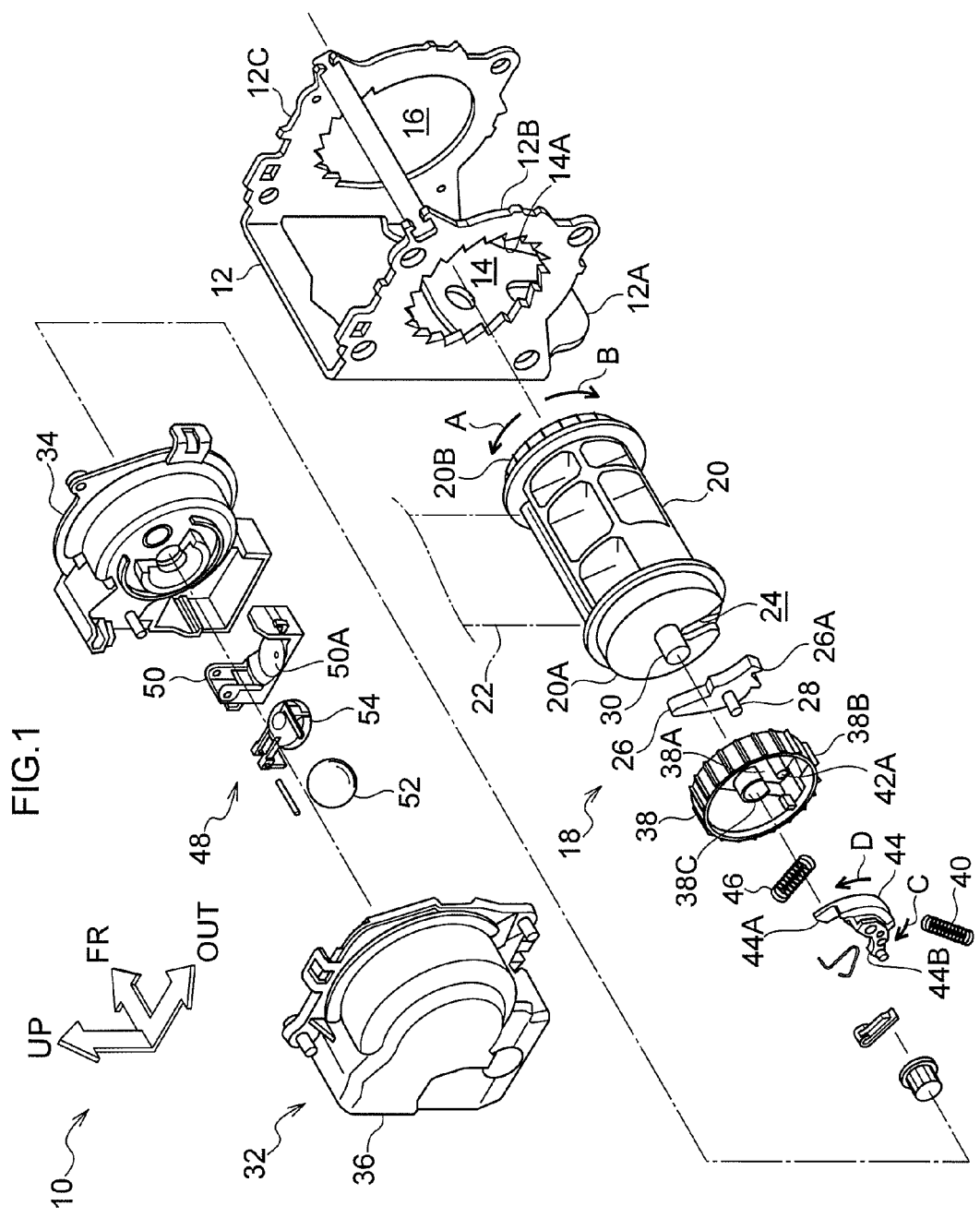
FIG. 1 is an exploded perspective view showing a webbing take-up device pertaining to the embodiment of the invention as seen in an oblique direction from a rear side, an outer side, and an upper side.

In FIG. 1, a webbing take-up device 10 pertaining to an embodiment of the invention is shown in an exploded perspective view as seen in an oblique direction from a rear side, an outer side, and an upper side. In the drawings, arrow FR indicates a front side (e.g., a vehicle front side) of the webbing take-up device 10, arrow OUT indicates an outer side (e.g., a vehicle width direction outer side) of the webbing take-up device 10, and arrow UP indicates an upper side.

As shown in FIG. 1, the webbing take-up device 10 pertaining to the present embodiment has a cross-sectionally U-shaped plate-like frame 12. A back plate 12A is provided on the inner side of the frame 12. The frame 12 is fixed to a vehicle body at the back plate 12A, whereby the webbing take-up device 10 is installed in the vehicle body. A leg plate 12B is provided on the rear side of the frame 12, and a leg plate 12C is provided on the front side of the frame 12. The leg plate 12B and the leg plate 12C oppose one another in the front and rear direction.

A substantially circular placement hole 14 is formed through the leg plate 12B, and a substantially circular placement hole 16 is formed through the leg plate 12C. The placement hole 14 and the placement hole 16 oppose one another in the front and rear direction. Furthermore, ratchet teeth 14A (inner teeth) that configure a lock mechanism 18 serving as a regulating mechanism are formed on the entire periphery of the placement hole 14.

A substantially cylindrical spool 20 serving as a take-up drum (take-up shaft) is provided between the leg plate 12B and the leg plate 12C of the frame 12. One end 20A on the rear side (the leg plate 12B side) of the spool 20 is disposed inside the placement hole 14 in the leg plate 12B. Another end 20B on the front side (the leg plate 12C side) of the spool 20 is disposed inside the placement hole 16 in the leg plate 12C. Due to this, the spool 20 is disposed in such a way that it can rotate in a circumferential direction with its axial direction parallel to the front and rear direction.

The base end side of a long band-like webbing (belt) 22 is anchored to the spool 20, and the webbing 22 is taken up onto the spool 20 from the base end side. When the spool 20 has rotated in a take-up direction (one direction in the circumferential direction; the direction indicated by arrow A in FIG. 1), the webbing 22 is taken up onto the spool 20. When the webbing 22 has been pulled out from the spool 20, the spool 20 is rotated in a pull-out direction (the other direction in the circumferential direction; the direction indicated by arrow B in FIG. 1). The webbing 22 extends toward the upper side from the frame 12 and can be put on an occupant seated in a seat of the vehicle.

A flat spiral spring (power spring), not shown in the drawings, serving as a take-up urging member is connected to the other end 20B of the spool 20. The flat spiral spring is disposed on the front side of the frame 12 (the front side of the leg plate 12C). The flat spiral spring urges the spool 20 in the take-up direction, and thus an urging force acts on the webbing 22 in the direction in which the webbing 22 is taken up onto the spool 20. For this reason, when the webbing 22 has been put on the occupant, slack in the webbing 22 is removed by the urging force of the flat spiral spring.

A housing hole 24 serving as a housing portion is formed in the one end 20A of the spool 20. The inside of the housing hole 24 opens to the radial direction outer side of the one end 20A. A long plate-like lock pawl 26 serving as a regulating member that configures the lock mechanism 18 is movably housed inside the housing hole 24. Lock teeth 26A are formed on one end of the lock pawl 26. A cylindrical actuation shaft 28 serving as an actuated portion is integrally provided on the lock pawl 26. The actuation shaft 28 projects toward the rear side from the lock pawl 26.

Figure 4:
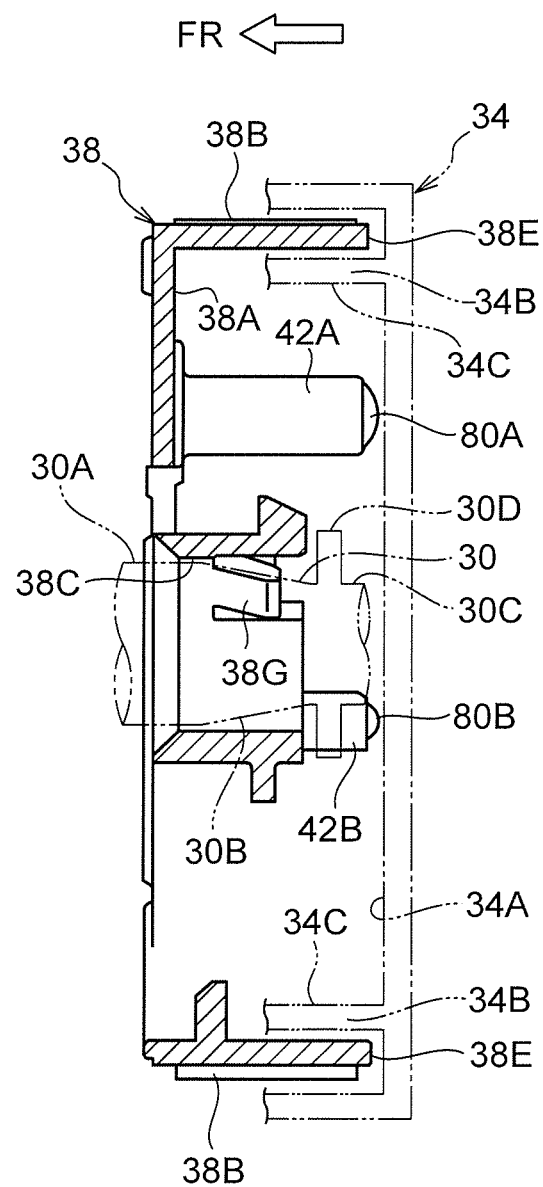
FIG. 4 is a cross-sectional view (a cross-sectional view along line 4-4 of FIG. 2), corresponding to FIG. 3, showing main components of the webbing take-up device pertaining to the embodiment of the invention.
Figure 5:
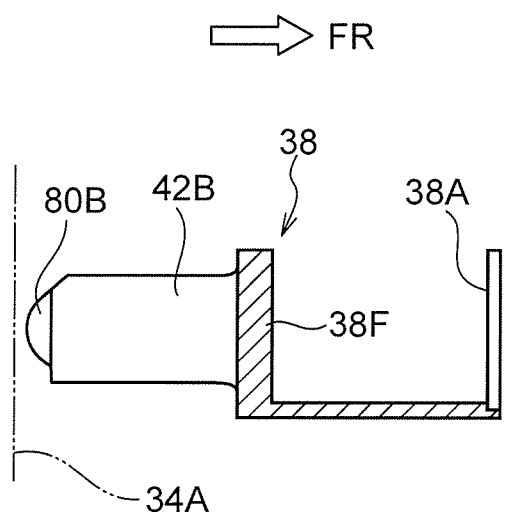
FIG. 5 is a cross-sectional view (a cross-sectional view along line 5-5 of FIG. 2) showing main components of the webbing take-up device pertaining to the embodiment of the invention.
Figure 6:
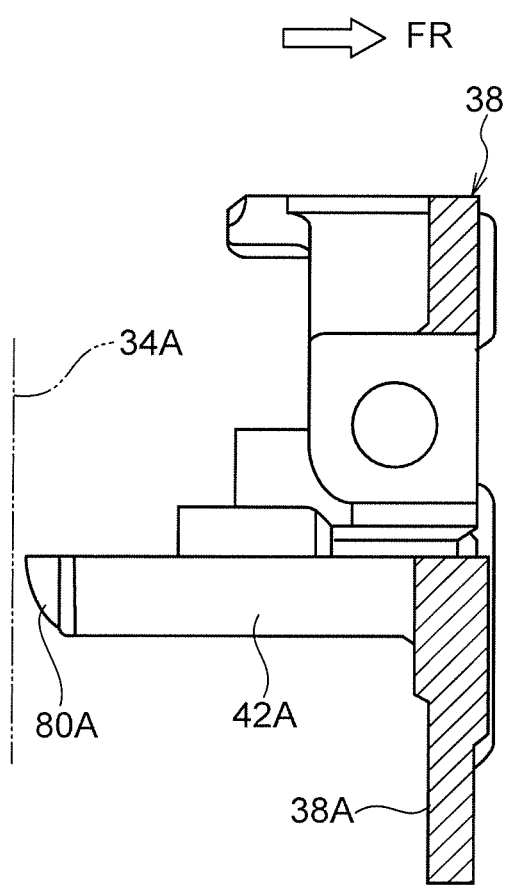
FIG. 6 is a cross-sectional view (a cross-sectional view along line 6-6 of FIG. 2) showing main components of the webbing take-up device pertaining to the embodiment of the invention.
Figure 7:
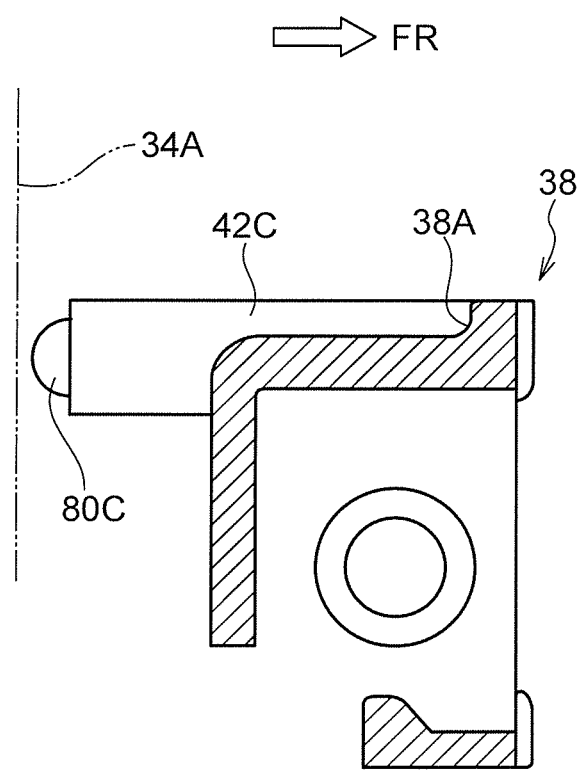
FIG. 7 is a cross-sectional view (a cross-sectional view along line 7-7 of FIG. 2) showing main components of the webbing take-up device pertaining to the embodiment of the invention.

A cylindrical rotating shaft 30 serving as a rotating portion is integrally provided on the one end 20A of the spool 20. The rotating shaft 30 projects toward the rear side from the spool 20 and is disposed coaxially with the spool 20. As indicated by chain double-dashed lines in FIG. 4, the rotating shaft 30 is configured by integrally forming, heading from the spool 20 toward the rear side, a rotating shaft body 30A whose diameter is unchanging (the same), a tapered portion 30B whose diameter continuously becomes smaller from the diameter of the rotating shaft body 30A, and a rotating shaft end portion 30C whose diameter is unchanging (the same) and the smallest. The rotating shaft body 30A is inserted into a rotating shaft hole 38C in a V gear 38 described below. A stopper portion 30D that is larger in diameter than the rotating shaft hole 38C and prevents the V gear 38 from coming off of the rotating shaft 30 is provided in a place where the tapered portion 30B and the rotating shaft end portion 30C connect to one another.

A sensor mechanism 32 that configures the lock mechanism 18 is provided on the rear side of the frame 12 (the rear side of the leg plate 12B).

A substantially bottomed tube-like sensor holder 34 made of resin is provided in the sensor mechanism 32. The interior of the sensor holder 34 opens to the front side (the leg plate 12B side), and the sensor holder 34 is fixed to the leg plate 12B. A bottom surface 34A (see FIG. 4) on the inside of the sensor holder 34 is flat, and the bottom surface 34A is disposed perpendicular to the axial direction of the spool 20. A substantially bottomed tube-like sensor cover 36 made of resin is provided on the rear side of the sensor holder 34 (on the opposite side of the leg plate 12B side). The interior of the sensor cover 36 opens to the front side, and the sensor cover 36 houses the sensor holder 34 and is fixed to the leg plate 12B.

A bottomed tube-like V gear 38 made of resin and serving as a rotation body (rotor) is provided inside the sensor holder 34. The inside of the V gear 38 opens to the rear side. A rotating shaft hole 38C is provided in the central axial portion of a bottom wall 38A of the V gear 38. The rotating shaft 30 of the spool 20 is inserted inside the rotating shaft hole 38C, and the V gear 38 is supported coaxially with the spool 20. Two claw portions 38G bent inward in the radial direction of the V gear 38 heading from the front side to the rear side and disposed in opposition to one another about a central axis are provided on the rear side (the sensor holder 34 side) of the rotating shaft hole 38C. The claw portion 38G is fitted with recessed portion (not shown in the drawings) provided in the tapered portion 30B of the rotating shaft 30. The V gear 38 configured in this way is rotatable in accompaniment with the rotation of the spool 20.

A long actuation groove (not shown in the drawings) serving as an actuation portion is formed in the bottom wall 38A of the V gear 38. The actuation shaft 28 of the lock pawl 26 is actuatably inserted into the actuation groove. A compression coil spring 40 serving as a rotation urging member is disposed bridging the V gear 38 and the one end 20A of the spool 20. The compression coil spring 40 urges the V gear 38 in the pull-out direction with respect to the spool 20 (urges the spool 20 in the take-up direction with respect to the V gear 38) and brings the actuation shaft 28 into contact with one lengthwise direction end of the actuation groove. Due to this, the rotation of the V gear 38 in the pull-out direction with respect to the spool 20 by the urging force of the compression coil spring 40 is stopped, and the V gear 38 is made rotatable in accompaniment with the spool 20. Furthermore, ratchet teeth 38B (outer teeth) are formed on the entire outer periphery of the V gear 38.

A cylindrical actuation shaft 42A is integrally provided on the bottom wall 38A of the V gear 38. The actuation shaft 42A projects in the V gear 38 parallel to the central axis of the V gear 38 in a position offset with respect to the central axis of the V gear 38. A W pawl 44 serving as an actuation member and an inertia member is actuatably (displaceably) supported at the actuation shaft 42A. A compression coil spring 46 serving as a return urging member is disposed bridging the W pawl 44 and the V gear 38. The compression coil spring 46 urges the W pawl 44 in a return direction (the direction indicated by arrow C in FIG. 1). The range of actuation of the W pawl 44 in the return direction by the urging force of the compression coil spring 46 is limited by a prismatic stopper portion 42B integrally provided on the bottom wall 38A of the V gear 38. Like the actuation shaft 42A, the stopper portion 42B projects in the V gear 38 parallel to the central axis of the V gear 38 in a position offset with respect to the central axis of the V gear 38. A restriction portion 44A is integrally provided on the end portion on the take-up direction side of the W pawl 44. The restriction portion 44A projects in the take-up direction from the W pawl 44.

When the V gear 38 has been rotated in the pull-out direction, the W pawl 44 generates an actuating force in an actuation direction (the direction indicated by arrow D in FIG. 1) with respect to the V gear 38 due to the force of inertia in the take-up direction with respect to the V gear 38. Moreover, when the V gear 38 has been rapidly rotated in the pull-out direction, the W pawl 44 is actuated in the actuation direction with respect to the V gear 38 counter to (against) the urging force of the compression coil spring 46, whereby an engaging portion 44B on the end portion on the pull-out direction side of the W pawl 44 engages with ratchet teeth (inner teeth) 34C serving as engaged portion provided on a circumferential direction inner wall 34B of the sensor holder 34 (see FIG. 2 and FIG. 4). Due to this, the rotation of the V gear 38 in the pull-out direction is stopped.

An acceleration sensor 48 is provided on the lower end portion of the sensor holder 34. A cross-sectionally U-shaped plate-like housing 50 is provided in the acceleration sensor 48, and a concave curved surface 50A is provided on the upper surface of the bottom wall of the housing 50. The inside of the curved surface 50A opens to the upper side, and a spherical ball 52 serving as an inertia body is rollably placed on the curved surface 50A. A substantially plate-like lever 54 is placed on the upper side of the ball 52, and the lever 54 is rotatably supported at its base end on the side wall of the housing 50. The V gear 38 is disposed on the upper side of the distal end of the lever 54, and the ball 52 is rolled and raised on the curved surface 50A of the housing 50, whereby the lever 54 is rotated toward the upper side so that its distal end meshes with the ratchet teeth 38B of the V gear 38. Due to this, the rotation of the V gear 38 in the pull-out direction is stopped.

When the rotation of the V gear 38 in the pull-out direction has been stopped as described above, when the spool 20 is rotated in the pull-out direction counter to (against) the urging force of the compression coil spring 40 with respect to the V gear 38, the actuation shaft 28 of the lock pawl 26 is actuated to the other lengthwise direction end side of the actuation groove in the V gear 38 and the lock pawl 26 is moved outward in the radial direction of the spool 20 (the one end 20A). Due to this, the lock teeth 26A of the lock pawl 26 mesh with the ratchet teeth 14A of the frame 12 (the leg plate 12B) and the rotation of the spool 20 in the pull-out direction is locked (regulated), whereby the pulling-out of the webbing 22 from the spool 20 is locked (regulated).

In the webbing take-up device 10 configured in this way, as shown in FIG. 2 to FIG. 7, tilt restricting portions 80A, 80B, and 80C that restrict tilt of the V gear 38 with respect to the central axial direction by being brought into contact (abutting) with the bottom surface 34A of the sensor holder 34 are provided at the V gear 38. As shown in FIG. 2, FIG. 3, FIG. 4, and FIG. 6, the tilt restricting portion 80A is provided at the inner side, in the radial direction of the V gear 38, than a place of engagement 82 (see FIG. 2) between the W pawl 44 and the ratchet teeth 34C. Further, the tilt restricting portion 80A projects further toward the sensor holder 34 side than an end surface 38E at the sensor holder 34 side of the V gear 38, which end surface is at the radial direction outer side than the place of engagement 82. The tilt restricting portion 80A is formed utilizing the actuation shaft 42A disposed projecting from the bottom wall 38A toward the sensor holder 34 side. Here, the tilt restricting portion 80A is integrally formed on an end portion at the sensor holder 34 side of the actuation shaft 42A. The tilt restricting portion 80A has a hemispherical shape whose top (apex) portion is at the sensor holder 34 side. Although it is not particularly limited to the numerical value as follows, the amount that the tilt restricting portion 80A projects from the end surface 38E is smaller than the distance by which the end surface 38E and the sensor holder 34 are spaced apart from one another and is, for example, set to the range of 0.25 mm to 0.6 mm. Furthermore, the shape of the tilt restricting portion 80A and the shapes of the tilt restricting portions 80B and 80C described below are not limited to a hemispherical shape and may also be a conical shape or triangular shape whose top portion is curved, provided that the shape is a shape whose area of contact with the sensor holder 34 is small.

As shown in FIG. 2 to FIG. 5, the tilt restricting portion 80B is disposed spaced apart from the restricting portion 80A in the circumferential direction of rotation of the rotating shaft hole 38C in the V gear 38, and the tilt restricting portion 80B projects further toward the sensor holder 34 side than the end surface 38E and provided at the radial direction inner side than the place of engagement 82 of the V gear 38. The tilt restricting portion 80B is formed utilizing the stopper portion 42B disposed projecting toward the sensor holder 34 side from a base 38F raised from the bottom wall 38A toward the sensor holder 34 side. Here also, the tilt restricting portion 80B is integrally formed on an end portion on the sensor holder 34 side of the stopper portion 42B. The shape and projecting amount of the tilt restricting portion 80B are similar or the same as the shape and projecting amount of the tilt restricting portion 80A.

As shown in FIG. 2, FIG. 3, FIG. 4, and FIG. 7, the tilt restricting portion 80C is disposed spaced apart from the tilt restricting portion 80A and the tilt restricting portion 80B in the circumferential direction of rotation of the rotating shaft hole 38C in the V gear 38. Like the tilt restricting portions 80A and 80B, the tilt restricting portion 80C projects further toward the sensor holder 34 side than the end surface 38E, the tilt restricting portion 80C is provided at the radial direction inner side than the place of engagement 82 of the V gear 38. Here also, the tilt restricting portion 80C is integrally formed on an end portion on the sensor holder 34 side of a cylindrical stand portion 42C disposed projecting from the bottom wall 38A toward the sensor holder 34 side parallel to the actuation shaft 42A and the stopper portion 42B. The shape and projecting amount of the tilt restricting portion 80C are similar or the same as the shape and projecting amount of the tilt restricting portion 80A.

Figure 2:
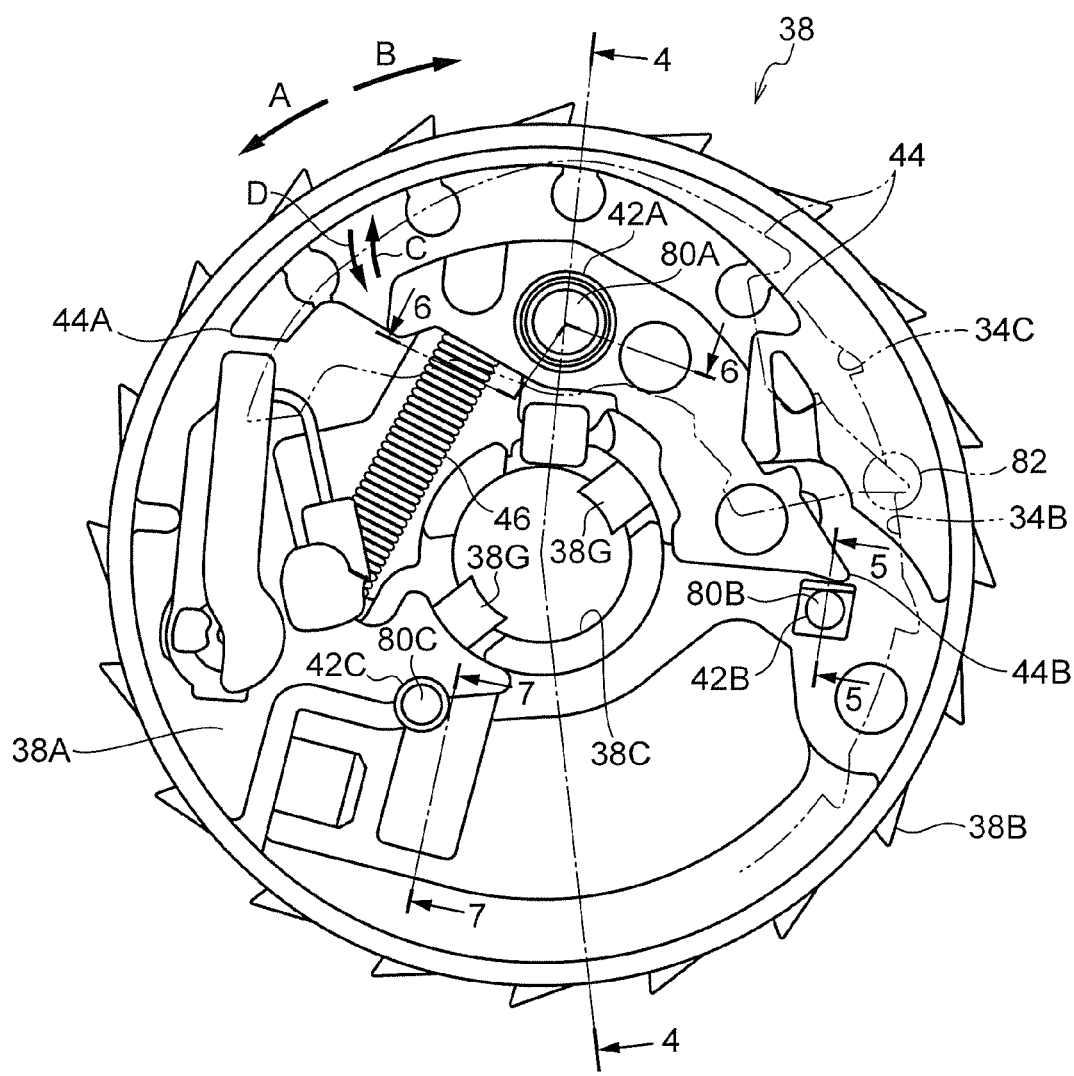
FIG. 2 is a front view showing main components of the webbing take-up device pertaining to the embodiment of the invention as seen from the rear side.
Figure 3:
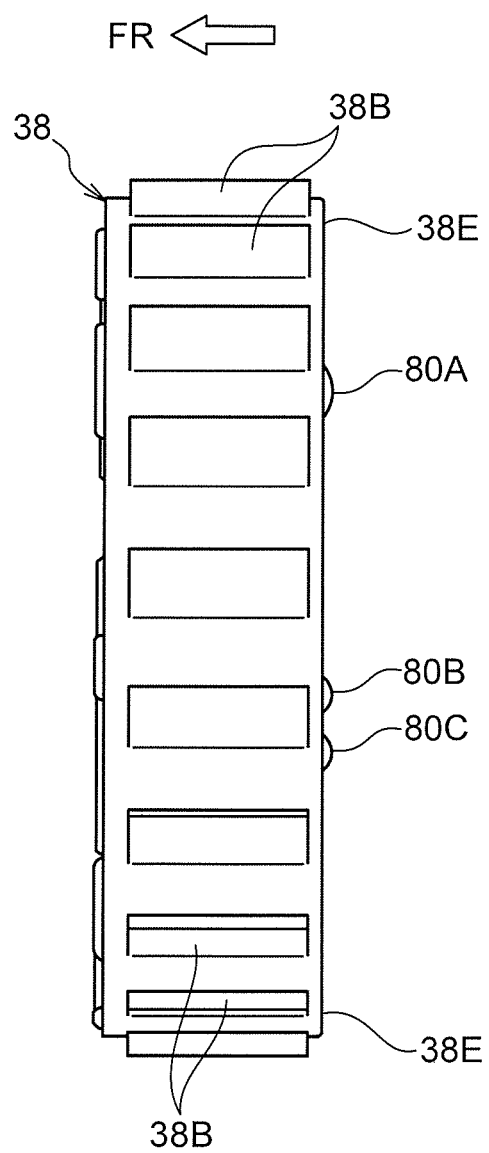
FIG. 3 is a side view showing main components of the webbing take-up device pertaining to the embodiment of the invention as seen from an inside direction.

As shown in FIG. 2, looking at the V gear 38 from the rear side, the tilt restricting portions 80A, 80B, and 80C are disposed in such a way as to form a substantially regular triangle when their top portions are interconnected by straight lines, and the tilt restricting portions 80A, 80B, and 80C are disposed at substantially equidistant intervals in the circumferential direction of the V gear 38. In the present embodiment, the tilt restricting portions 80A, 80B, and 80C are disposed in three places on the V gear 38, but tilt restricting portions may also be placed in four or more places.

Next, operation and effect of the present embodiment will be described. In the webbing take-up device 10 having the above configuration, the webbing 22 is pulled out from the spool 20 and put on the occupant as a result of the webbing 22 being pulled so that the spool 20 and the V gear 38 are rotated in the pull-out direction counter to (against) the urging force of the flat spiral spring.

When the vehicle has been rapidly decelerated, in the acceleration sensor 48, the ball 52 is rolled and raised on the curved surface 50A of the housing 50, whereby the lever 54 is rotated toward the upper side and the distal end of the lever 54 meshes with the ratchet teeth 38B of the V gear 38. Due to this, the rotation of the V gear 38 in the pull-out direction is stopped.

When the vehicle has been rapidly decelerated, the occupant is moved by the force of inertia, whereby the webbing 22 is pulled out from the spool 20 by the occupant, and the spool 20 and the V gear 38 are rapidly rotated in the pull-out direction. Due to this, the W pawl 44 is actuated in the actuation direction with respect to the V gear 38 counter to (against) the urging force of the compression coil spring 46 by the force of inertia in the take-up direction with respect to the V gear 38, whereby the W pawl 44 engages with the sensor holder 34 and the rotation of the V gear 38 in the pull-out direction is stopped.

When the rotation of the V gear 38 in the pull-out direction has been stopped as described above, the spool 20 is rotated in the pull-out direction counter to (against) the urging force 40 of the compression coil spring 40 with respect to the V gear 38, whereby the actuation shaft 28 of the lock pawl 26 is moved to the lengthwise direction other end side of the actuation groove in the V gear 38, and the lock pawl 26 is actuated outward in the radial direction of the spool 20. Due to this, the lock teeth 26A of the lock pawl 26 mesh with the ratchet teeth 14A of the frame 12 and the rotation of the spool 20 in the pull-out direction is locked, whereby the pulling-out of the webbing 22 from the spool 20 is locked and the occupant is restrained by the webbing 22.

Incidentally, in the webbing take-up device 10 pertaining to the present embodiment, when the V gear 38 has been rotated in the pull-out direction and the W pawl 44 has been actuated (displaced) in the actuation direction, the W pawl 44 engages with the ratchet teeth 34C provided on the inner wall 34B of the sensor holder 34.

Here, the tilt restricting portions 80A, 80B, and 80C are disposed on the V gear 38. The tilt restricting portions 80A, 80B, and 80C are provided in the V gear 38 at the radial direction inner side than the place of engagement 82 between the W pawl 44 and the ratchet teeth 34C, and project further toward the sensor holder 34 side than the end surface 38E at the sensor holder 34 side of the V gear 38, which end surface is disposed on the radial direction outer side than the place of engagement 82. For this reason, tilt of the V gear 38 that occurs when the V gear 38 has been rotated in the pull-out direction and the W pawl 44 is actuated and engages with the ratchet teeth 34C is restricted due to the tilt restricting portions 80A, 80B, and 80C being brought into contact with the bottom surface 34A of the sensor holder 34 before the end surface 38E of the V gear 38 contacting. Consequently, tilt of the V gear 38 when the W pawl 44 has been actuated and the lock mechanism 18 has been activated can be effectively suppressed.

Furthermore, in the webbing take-up device 10 pertaining to the present embodiment, the columnar stopper portion 42 that limits the actuation range of the W pawl 44 (the moving range of the engaging portion 44B) toward inside in the radial direction and that protrudes toward the sensor holder 34 side is provided on the V gear 38. The tilt restricting portion 80B is provided on the end portion at the sensor holder 34 side of the stopper portion 42B. Here, the stopper portion 42B is provided in the neighborhood of the W pawl 44, so even in a case where tilt has occurred in the W pawl 44 when the W pawl 44 has been actuated and has engaged with the ratchet teeth 34C, the tilt restricting portion 80B is brought into contact with the bottom surface 34A of the sensor holder 34 before the W pawl 44 contacting. Consequently, the W pawl 44 can be suppressed from being brought by the tilt into contact with the sensor holder 34.

Furthermore, the tilt restricting portion 80B is disposed on the end portion of the stopper portion 42B. If the V gear 38 and the stopper portion 42B are integrally formed by injection-molding of a resin material, the tilt restricting portion 80B can be integrally formed together with these. For this reason, the tilt restricting portion 80B can be easily manufactured.

Moreover, in the webbing take-up device 10 pertaining to the present embodiment, the columnar shaped actuation shaft 42A that actuatably supports the W pawl 44 and that protrudes toward the sensor holder 34 side is provided on the V gear 38. The tilt restricting portion 80A is provided on the end portion at the sensor holder 34 side of the actuation shaft 42A. Here, the W pawl 44 is supported on the actuation shaft 42A and is provided in the neighborhood of the actuation shaft 42A, so even in a case where tilt has occurred in the W pawl 44 when the W pawl 44 has engaged with the ratchet teeth 34C, the tilt restricting portion 80A is brought into contact with the bottom surface 34A of the sensor holder 34 before the W pawl 44 contacting. Consequently, the W pawl 44 can be suppressed from being brought by the tilt into contact with the sensor holder 34.

Furthermore, the tilt restricting portion 80A is disposed on the end portion of the actuation shaft 42A. Like the stopper portion 42B, if the V gear 38 and the actuation shaft 42A are integrally formed by injection-molding of a resin material, the tilt restricting portion 80A can be integrally formed together with these. For this reason, the tilt restricting portion 80A can be easily manufactured.

Moreover, in the webbing take-up device 10 pertaining to the present embodiment, the tilt restricting portions 80A, 80B, and 80C are disposed in three places spaced apart from one another in the circumferential direction of the rotating shaft hole 38C in the V gear 38. When tilt has occurred in the V gear 38, the tilt of the V gear 38 is suppressed by for example the tilt restricting portions 80A and 80B in the first place and the second place that have made contact with the sensor holder 34. Additionally, when tilt has further occurred in the V gear 38, for example the tilt restricting portion 80C in the third place makes contact with the sensor holder 34. So finally the tilt of the V gear 38 is reduced.

Furthermore, in the webbing take-up device 10 pertaining to the present embodiment, the tilt restricting portions 80A, 80B, and 80C are formed in a hemispherical shape whose top portion is at the sensor holder 34 side. For this reason, friction between the tilt restricting portions 80A, 80B, and 80C and the bottom surface 34A of the sensor holder 34 can be kept small so that the affect on the rotation of the V gear 38 when the tilt restricting portions 80A, 80B, and 80C have made contact with the bottom surface 34A of the sensor holder 34 can be reduced.

Moreover, in the webbing take-up device 10 pertaining to the present embodiment, the ratchet teeth 38B of the V gear 38 and the distal end of the lever 54 of the acceleration sensor 48 can mesh in a more appropriate posture due to tilt of the V gear 38 is reduced. For this reason, the sensing performance of the acceleration sensor 48 in the event of rapidly deceleration of the vehicle can be improved.

What is claimed is:

1. A webbing take-up device comprising:
    a frame;
    a spool that is mounted to the frame and rotated in a pull-out direction by a webbing being pulled out;
    a rotation body that is rotated in accompaniment with the rotation of the spool;
    an actuation member that is provided at the rotation body and that is actuated when the rotation body is rotated in the pull-out direction as a result of an acceleration equal to or greater than a predetermined value;
    a regulating member including a pawl that, when actuated, regulates rotation of the spool in the pull-out direction;
    a sensor holder that is mounted to the frame and disposed to face the rotation body, and that engages with the actuation member when the actuation member is actuated whereby the regulating member is actuated; and
    a tilt restricting portion that is disposed on the rotation body, that projects further toward a sensor holder side than an end surface at the sensor holder side of the rotation body, that is closer to an axis of rotation of the rotation body in a radial direction than an engagement place at which the actuation member and the sensor holder are engaged, and that restricts tilt of the rotation body with respect to an axial direction of the rotation body by being brought into contact with the sensor holder,
    wherein a columnar-shaped portion is stationarily mounted on the rotation body and protrudes toward the sensor holder side from the rotation body, and the tilt restricting portion is provided at an end portion, which is at the sensor holder side, of the columnar-shaped portion, and
    wherein an end surface, at the sensor holder side of the tilt restricting portion directly contacts the sensor holder to restrict tilt of the rotation body before any other portion of the rotation body contacts the sensor holder.

2. The webbing take-up device of claim 1, wherein the columnar-shaped portion is a stopper portion that limits an actuation range of the actuation member.

3. The webbing take-up device of claim 2, wherein
    the rotation body has columnar-shaped portions that protrude toward the sensor holder side,
    the tilt restricting portions are respectively provided at end portions, which are at the sensor holder side, of the columnar-shaped portions, one of the columnar-shaped portions is a stopper portion that limits an actuation range of the actuation member, and another one of the columnar-shaped portions is an actuation shaft that actuably supports the actuation member.

4. The webbing take-up device of claim 1, wherein the columnar-shaped portion is an actuation shaft that actuatably supports the actuation member.

5. The webbing take-up device of claim 1, wherein a plurality of tilt restricting portions are respectively disposed in three or more places on the rotation body, which places are separated from one another in a circumferential direction of rotation of the rotation body.

6. The webbing take-up device of claim 1, wherein the tilt restricting portion is formed in a hemispherical shape whose top portion is located at the sensor holder side.

7. The webbing take-up device of claim 1, wherein the tilt restricting portion is integrally formed on the end portion of the columnar-shaped portion.

8. A webbing take-up device comprising:
a frame;
a spool that is mounted to the frame and rotated in a pull-out direction by a webbing being pulled out;
a rotation body that is rotated in accompaniment with the rotation of the spool;
an actuation member that is provided at the rotation body and that is actuated when the rotation body is rotated in the pull-out direction as a result of an acceleration equal to or greater than a predetermined value;
a regulating member including a pawl that, when actuated, regulates rotation of the spool in the pull-out direction;
a sensor holder that is mounted to the frame and disposed to face the rotation body, and that engages with the actuation member when the actuation member is actuated whereby the regulating member is actuated; and
a tilt restricting portion that is disposed on the rotation body, and that restricts tilt of the rotation body with respect to an axial direction of the rotation body by being brought into contact with the sensor holder, wherein:
a columnar shaped portion is provided at the rotation body and protrudes toward a sensor holder side from the rotation body, and the tilt restricting portion is provided at an end portion, which is at the sensor holder side, of the columnar shaped portion;
the rotation body has a bottomed tube shape opening at the sensor holder side,
the rotation body includes a bottom wall portion, and a tube portion extending toward the sensor holder side from the bottom wall portion;
an actuation shaft is arranged inside of the tube portion when viewed along the axial direction of the rotation body, and is provided at the bottom wall portion,
the actuation member is arranged inside of the tube portion when viewed along the axial direction of the rotation body, and is movably supported at the actuation shaft;
the columnar shaped portion is arranged inside the tube portion when viewed along the axial direction of the rotation body, and is provided at the bottom wall portion;
the actuation member and the sensor holder are engaged at an engagement place from non-engaged state of the actuation member and the sensor holder when the rotation body is rotated in the pull-out direction with the acceleration equal to or greater than the predetermined value, the engagement place is inside of the tube portion when viewed along the axial direction of the rotation body;
an end surface, at the sensor holder side, of the tilt restricting portion projects further toward the sensor holder side than an end surface, at the sensor holder side, of the tube portion; and
the end surface, at the sensor holder side, of the tilt restricting portion directly contacts the sensor holder to restrict tilt of the rotation body before any other portion of the rotation body contacts the sensor holder.

9. The webbing take-up device of claim 8, wherein the tilt restricting portion is closer to an axis of rotation of the rotation body in a radial direction than an engagement place at which the actuation member and the sensor holder are engaged.

* * * * *